US007756935B2

(12) United States Patent  (10) Patent No.: US 7,756,935 B2
Gaucas  (45) Date of Patent: Jul. 13, 2010

(54) E-MAIL BASED ADVISOR FOR DOCUMENT REPOSITORIES

(75) Inventor: Dale Ellen Gaucas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 718 days.

(21) Appl. No.: 11/668,883

(22) Filed: Jan. 30, 2007

(65) Prior Publication Data

US 2008/0183833 A1   Jul. 31, 2008

(51) Int. Cl.
*G06F 15/16* (2006.01)
*G06F 17/30* (2006.01)

(52) U.S. Cl. ................. 709/206; 709/207; 709/204; 713/176; 713/171; 713/155; 713/170; 726/22

(58) Field of Classification Search ........... 709/204, 709/206, 217, 207
See application file for complete search history.

(56) References Cited

U.S. PATENT DOCUMENTS

| 7,035,903 | B1 | 4/2006 | Baldonado |
| 2003/0014482 | A1 | 1/2003 | Toyota et al. |
| 2003/0041112 | A1 | 2/2003 | Tada et al. |
| 2005/0060375 | A1* | 3/2005 | Ernest et al. ............ 709/206 |
| 2005/0138121 | A1 | 6/2005 | Banatwala et al. |
| 2006/0037075 | A1* | 2/2006 | Frattura et al. ............ 726/22 |
| 2006/0085516 | A1 | 4/2006 | Farr et al. |
| 2007/0115980 | A1* | 5/2007 | Aaron et al. ............ 370/392 |
| 2007/0198549 | A1* | 8/2007 | Hamdy et al. ............ 707/100 |

* cited by examiner

*Primary Examiner*—Jude J Jean Gilles
(74) *Attorney, Agent, or Firm*—Pepper Hamilton LLP

(57) ABSTRACT

A method is disclosed which monitors a plurality of electronic messages. Two or more electronic messages from the plurality of messages may be identified. Each identified message may contain an attachment. The attachments of the identified messages may be compared to determine a similarity score. The similarity score may be examined to determine if it exceeds a similarity threshold value. If the similarity score exceeds the similarity threshold value, a user may be notified that collaboration may be occurring. The user may also be provided automated support for porting the attachments to a document management system.

20 Claims, 5 Drawing Sheets

E-MAIL BASED ADVISOR FOR DOCUMENT REPOSITORIES

BACKGROUND

Electronic mail systems and discussion boards allow individuals to communicate with one another. The electronic mail (e-mail) messages are delivered to an individual's account or displayed on a discussion board. The messages can be organized into discussion threads. U.S. Patent Application Publication No. 20050138121, the disclosure of which is incorporated herein by reference in its entirety, discloses a discussion resource forum where the topics are organized into threads and the postings under a single thread are considered related. Similarly, U.S. Patent Application Publication No. 20030014482, the disclosure of which is incorporated herein by reference in its entirety, discloses a community-based collaborative knowledge system which threads related messages.

In addition to electronic mail systems, the use of a document management system is well known in the art. U.S. Patent Application Publication No. 20060085516, the disclosure of which is incorporated herein by reference in its entirety, discloses a method and apparatus combining an e-mail system and a document management system by e-mailing an image that the document management system manages. It is well known in the art that e-mail messages are often sent with documents attached called attachments. U.S. Patent Application Publication No. 20030041112, the disclosure of which is incorporated herein by reference in its entirety discloses a computerized document management system which stores electronic mail and extracts and stores the attachments. However, the document management systems do not organize the attachments, nor do they establish a relationship between attachments.

The disclosure contained herein describes the methods of resolving one or more of the problems discussed above.

SUMMARY

In one embodiment, a method is disclosed which may examine a first attachment in a first message and a second attachment in a second message of a user. The first attachment may be compared to the second attachment to determine if the attachments are related. If the attachments are related, the user may be notified that collaboration may be occurring.

In one embodiment, at least one of the attachments may be ported to a document management system. The porting may be automatic. The user may be notified that at least one of the attachments was ported to the document management system. In one embodiment, one or more collaborators may also be notified that at least one of the attachments was ported to the document management system.

In one embodiment, the first message may be compared to the second message to determine if the first message is related to the second message. Comparing the messages may include, but is not limited to, info nation in a reference header, title, sender names and/or receiver names. Comparing the first message to the second message also may include determining if the messages are located in a discussion thread. In one embodiment, notification may be performed only if the first message and the second message are determined to be related.

In one embodiment, comparing the attachments may include comparing at least one of, but is not limited to, the file name, application, title, size and/or key word. If the comparison determines that the attachments are related, the attachments may be managed in a document management system.

Managing the attachments in the document management system may include creating a document identifier and creating a version identifier. The user may be notified that the attachments were ported to the document management systems. One or more collaborators may be notified that the attachments were ported to the document management system.

In one embodiment, the first message may have been received into the user's account. Alternatively, the first message may not yet have been received into the user's account. In one embodiment, the first message may have been sent from the user's account. Alternatively, the first message and the second message may be compared before entering the user's account.

In anther embodiment, a method may include monitoring a plurality of electronic messages. A first electronic message from the plurality of electronic messages may be identified wherein the first electronic message contains a first attachment. A second electronic message from the plurality of electronic messages may be identified wherein the second electronic message contains a second attachment. The first attachment may be compared with the second attachment to create a pair. A similarity score for the pair may be determined as well as if the similarity score for the pair exceeds a similarity threshold value. If the similarity threshold value is exceeded for a predetermined number of pairs, a user may be notified that collaboration may be occurring.

In another embodiment, a method is disclosed which monitors a plurality of electronic messages. Two or more electronic messages from the plurality of messages may be identified. Each identified message may contain an attachment. The attachments of the identified messages may be compared to determine a similarity score. The similarity score may be examined to determine if it exceeds a similarity threshold value. If the similarity score exceeds the similarity threshold value, a user may be notified that collaboration may be occurring.

In one embodiment, notification may occur only if the number of attachments having a similarity score that exceeds the similarity threshold value is more than an attachment threshold value. In one embodiment, at least one of the attachments having a similarity score that exceeds the similarity threshold value may be ported.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
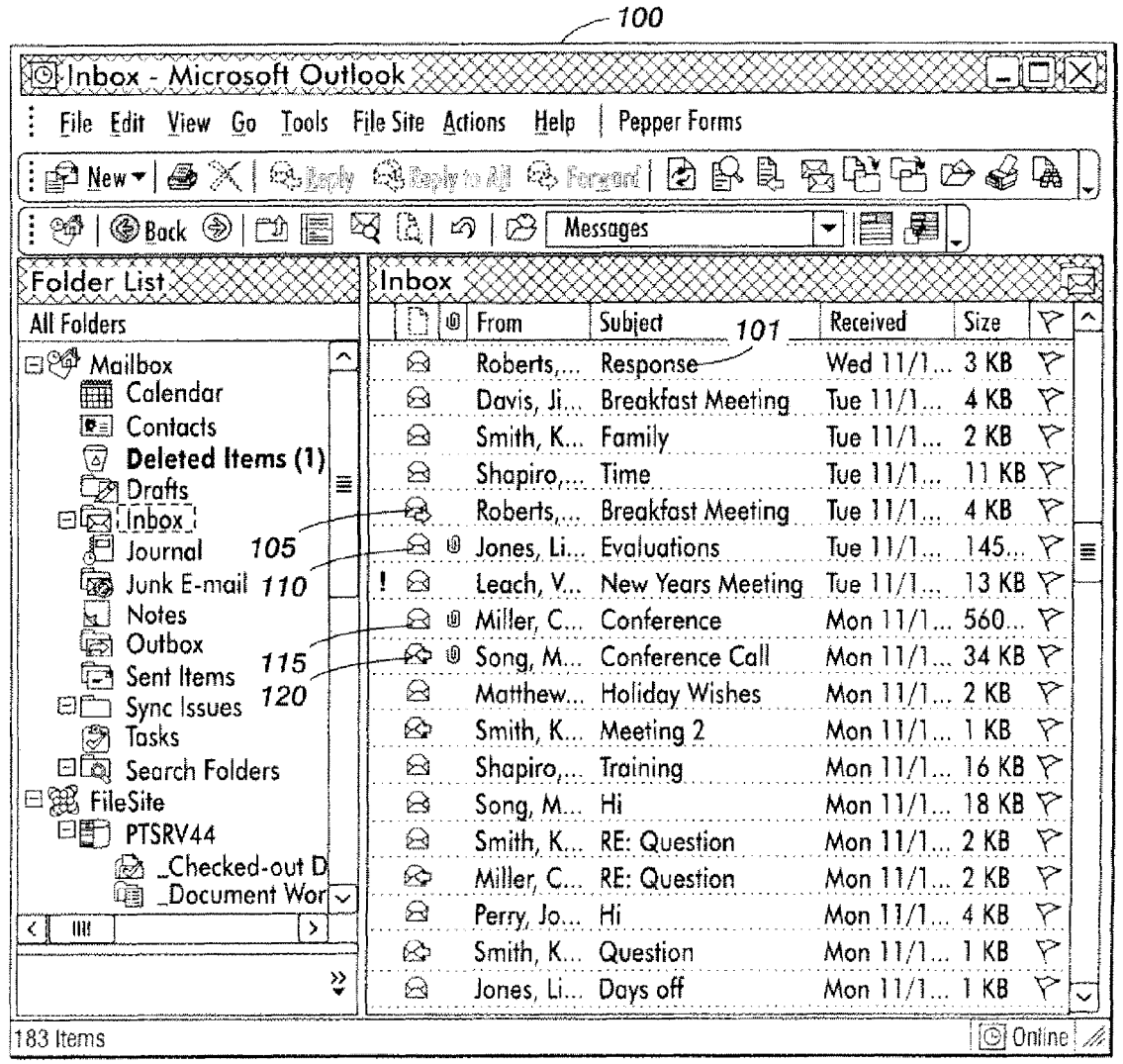
FIG. 1 depicts one embodiment of an account containing messages and attachments.
Figure 2:
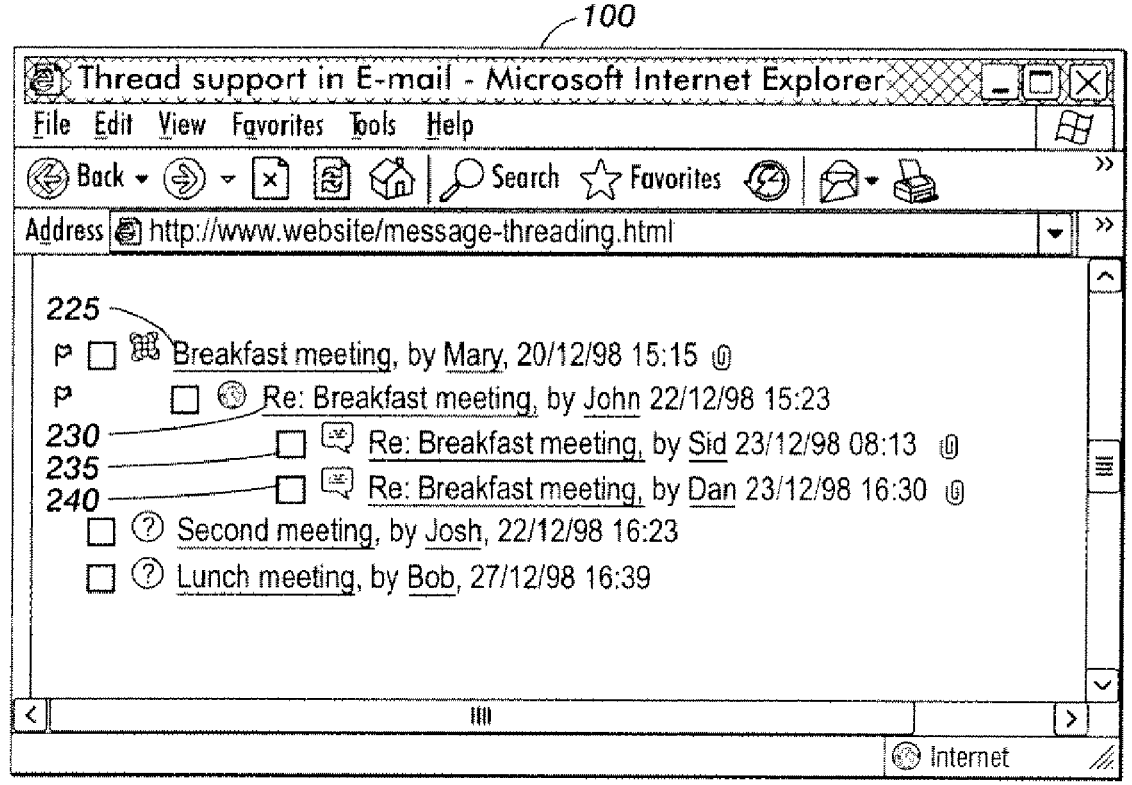
FIG. 2 depicts one embodiment of an account containing threaded groups of messages and attachments.

FIGS. 1 and 2 show an example of an account 100 which can send, receive and store messages. An account 100 is a storage facility on a computer containing messages and/or electronic documents. In one embodiment, accounts may be located on computing devices connected to a network by a wide area network (WAN), local area network (LAN), Internet or another communications network. Messages inside an account may include, but are not limited to, electronic mail, instant message, text message, and/or other forms of electronic communication. As shown in FIG. 1, in one embodiment, the messages 105, 110, 115, 120 contained within an account may contain attachments. Attachments are documents that are sent with, or attached to, a message. Attachments may include, but are not limited to, word processing documents, spreadsheets, portable document format (PDF) products, flowchart applications, presentations, and other word processing programs or electronic documents. The term attachment may be used to refer to a single attachment or may refer to multiple attachments.

In one embodiment, the system may examine event message in the account to determine which messages contain attachments. In FIG. 1, the system may look at 105, 110, 115, and 120 to determine if any of those messages contain one or more attachments. The system may find that message 105 does not contain an attachment. Therefore, the system may continue to search for messages with attachments. Since message 110 contains an attachment, the attachment of message 110 may be examined. The system may then look for other messages containing an attachment. The system may find that message 115 contains an attachment and may then compare the attachment for message 115 with the attachment for message 110 by the process described below. After the system has compared attachment for message 110 to the attachment for message 115, the system may pick the attachment for message 120 to examine against the original attachment for message 110. Alternatively, the attachments associated with messages 110, 115 and 120 may be compared simultaneously.

In one embodiment, attachments do not need to be located in the account to be compared. One or more attachments may be compared to other attachments on the network level as they are received into the account. Two attachments not yet in the account may be compared. Alternatively, an attachment in the account can be compared with an attachment not yet in the account. For example, the attachment for message 110 can be examined and compared with an attachment that has not yet been received into the account.

In a different embodiment, the attachments that are sent from the account may also be examined. Attachments sent to others can be compared with attachments that are both sent from and received by a user. The system may search for new messages that contain attachments as soon as they are received by the system, each time an attachment is received by the account, each time an attachment is sent, after a set period of time, or after an irregular interval.

In another embodiment, as shown in FIG. 2, messages may be grouped through the use of message thread processing 225, 230, 235, 240. Thread processing allows messages to be grouped when one message is related to another as a response, forward, or reply of the other. For example, in FIG. 2, message 230 is a reply to message 225 and messages 235 and 240 are replies to message 230. In one embodiment, thread processing may occur on the server. In another embodiment, thread processing may occur on the client system. In one embodiment, only the messages containing attachments within the thread group may be compared. The system may select a first message with an attachment and a second message with an attachment from within a message thread group. For example, the attachment for message 225 may be compared with the attachment for message 235. Subsequently, the attachment for message 225 may be compared with the attachment for message 240 and the attachment for message 235 may be compared with the attachment for message 240. Therefore, all attachments within a message thread may be compared. In an alternate embodiment, the attachments in different message threads may be compared. The attachments can be compared by examining one attachment with another or examining multiple attachments simultaneously.

Figure 3:
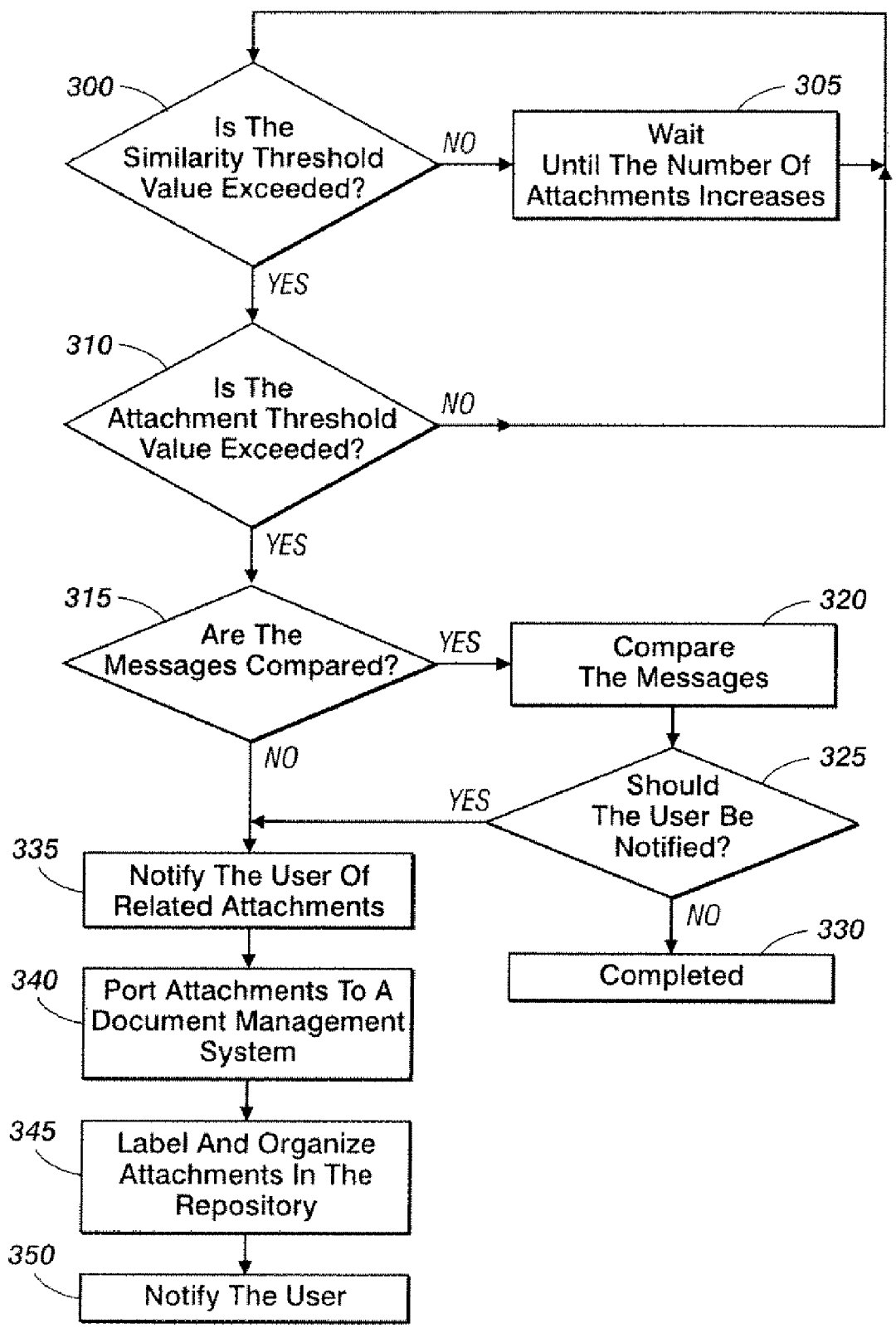
FIG. 3 depicts a flowchart describing one embodiment of all e-mail based advisor method.

FIG. 3 depicts a flowchart describing one embodiment of an e-mail based advisor method for porting an e-mail based document collaboration to a document repository. Messages with attachments may be examined to determine if collaboration is occurring. In one embodiment, a message contains a single attachment. In another embodiment, the message contains multiple attachments. The system may create a similarity score by comparing attachments. In one embodiment, the attachments may be compared to one another in pairs. In another embodiment, three or more attachments may be compared to create a similarity score. The system may determine if the similarity score exceeds a similarity threshold value 300. A similarity score is created to determine if collaboration is occurring. Collaboration can occur when documents are related such as when one document is created and saved and later that document is altered and saved without replacing the original document. Related attachments may be created when a user sends a message with an attachment containing revisions from an old attachment. The system may analyze the attachment for a message which is located in a user's account to determine if other messages contain the same attachment or a variant of that attachment.

The system may determine if collaboration is occurring by examining characteristics of the attachments including, but not limited to, the file name, size, word count, keywords, title or application. After examining the characteristics of the attachments, a similarity score may be created. In one embodiment, the higher the similarity value, the greater the probability that collaboration is occurring. The similarity score of attachments call be compared with the similarity threshold value. The similarity threshold value may be a predetermined value used to separate attachments that have a higher probability of collaboration with those that have a lower probability of collaboration. In one embodiment, if the similarity score exceeds the similarity threshold value, then collaboration has occurred.

Figure 4:
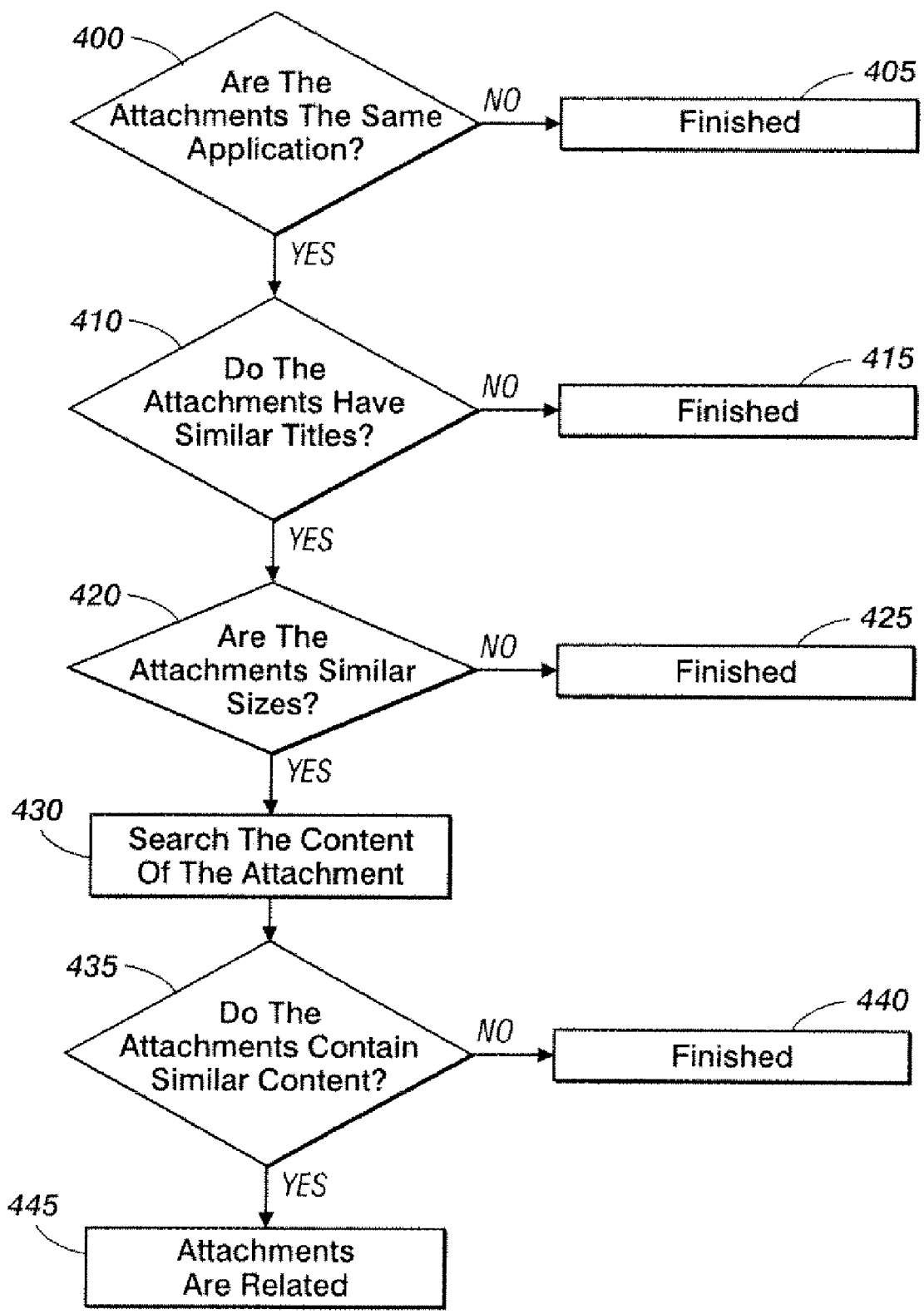
FIG. 4 depicts a flowchart of one embodiment of a method of comparing characteristics of an attachment.

FIG. 4 illustrates several examples of how attachments may be compared to determine a similarity score. In one embodiment, there may be one or more tests used on an attachment to determine whether collaboration has occurred. Each attachment may be compared to every other attachment. Each attachment may be paired with every other attachment and a similarity score may be determined. In one embodiment, a similarity score may be determined by a comparison module. The comparison module may contain software for comparing various characteristics of the attachments and creating a similarity score. The similarity score may be stored in a processor readable-storage medium which may include, but is not limited to, a database and random access memory. Alternatively, the similarity score may not be stored and may be reevaluated each time there is a new attachment to compare. In one embodiment, a single similarity score can be created based on all the individual comparisons. In an alternative embodiment, a similarity score can be determined from each comparison and then the scores can be averaged to determine a final similarity score for the pair of attachments.

In one comparison, the system may check the application type of the attachments 400. In a further example, if one attachment is a portable document format (PDF) while the other is in a word processing document, then the attachments are two different applications and the attachments are not related 405.

However, if the application type is the same for all the examined attachments, then the system may took to the title, message subject heading, or file name 410 of the attachments. The name on one attachment may contain most of the same characters of the other attachment. Therefore, the system may find the attachments to be related and look to subsequent characteristics. In a further example, one attachment may be titled "Med Records", a second attachment is titled "Medical Records 3", and a third attachment is titled "Medical Records." The system in this embodiment may count the number of similar letters when comparing each attachment with every other attachment and use this information to create similarity scores. If the titles are not similar, the system may finish 415.

However, if the titles are similar, the system may examine the attachment's size to determine if the attachments are of a similar size 420. For attachments to be related, the size of the attachments may be within a certain percentage of the other attachments or one attachment may be plus or minus a certain size of other attachment. If they are not related, then the system may finish 425.

If the file sizes of the attachments are similar, then the words inside the attachments may be searched to determine if the content in the attachments are similar 430. Searching the content of the attachments may involve word processing software or other software needed for character or word searching. The searching may include, but is not limited to, general word repetition, character repetition, sentence repetition, or using other techniques for comparing documents. In another embodiment, the content inside the attachment may be an image. Images may be compared using various computer aided design and software programs. In an alternative embodiment, the content may include numerical data, columns, charts, or graphs. The system may compare this information using various software applications such as, but not limited to, spreadsheet and database applications. In all of the above embodiments, the system may determine if the attachments contain similar content 435. If similar content is not used, the system may finish as the attachments are unrelated 440. However, if the attachments contain similar content, the attachments are related 445.

In one embodiment, the procedure described above may occur in any order. In another embodiment, only some of the characteristics may be examined. In another embodiment, other characteristics of the attachments may be used to determine if the attachments are related. In one embodiment, the procedure described can occur for any number of attachments being compared simultaneously.

Returning to FIG. 3, if the similarity threshold value is not exceeded, then the system may wait for more attachments 305. If the similarity threshold value is exceeded, tile system may determine if the attachment threshold value is exceeded 310. In one embodiment, the attachment threshold value is the minimum number of attachments having a similarity score that exceeds an attachment threshold value. The attachment threshold value may be a predetermined number that determines how many attachments must be related before porting or user notification can occur. In FIG. 3, the system may need to exceed the attachment threshold value in order for the user to be notified 335. If the attachment threshold value is not exceeded, the system may wait until there are more attachments 305.

Figure 5:
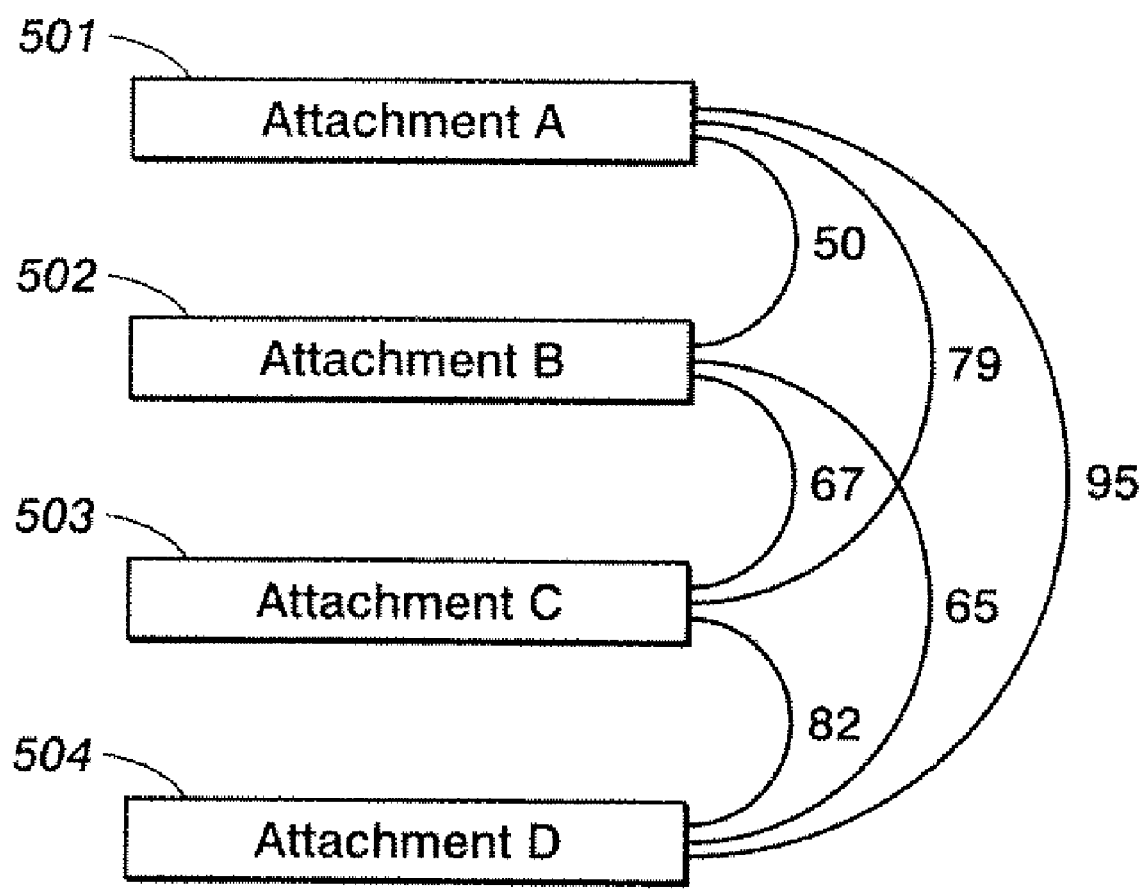
FIG. 5 depicts one embodiment of determining if the attachments exceed both the similarity threshold value and the attachment threshold value by examining the similarity scores.

FIG. 5 depicts one embodiment of the system determining if the attachments exceed both the similarity threshold value and the attachment threshold value by examining the similarity scores. In one embodiment, the attachment threshold value is 2 and the similarity threshold value is 75 and there are four attachments currently in the system, Attachment A 501, Attachment B 502, Attachment C 503, and Attachment D 504. Attachment A 501 may have a similarity score with Attachment B 502 of 50, a similarity score with Attachment C 503 of 79, and a similarity score with Attachment D 504 of 95. Therefore, the similarity scores of attachments A and C, 501 and 503, and Attachments A and D, 501 and 504, exceed the similarity threshold value. Additionally, the similarity score of Attachments C and D, 503 and 504, exceed the similarity threshold value.

After the similarity scores are established, the system can determine if the number of pairs of attachments which exceeded the similarity threshold value have exceeded the attachment threshold value. In this embodiment, since the system contains three pairs of attachments, Attachments A and C, 501 and 503, Attachments A and D 501 and 504, and Attachments C and D, 503 and 504, which exceeded the similarity threshold value, the attachment threshold value is also exceeded.

Returning to FIG. 3, the system may determine if the attachment threshold value and the similarity threshold value have been exceeded. If either the attachment threshold value and/or the similarity threshold value have not been exceeded, the system may wait for new attachments to be compared 305. If the attachment threshold value and the similarity threshold value are exceeded, the system may choose whether or not to examine the messages that were sent with the attachments 315. The system may compare the messages 320 to determine if the messages are related to one another. Messages may be related if one message is a response, forward, or reply of another message. Related messages may be created by the same or different senders called collaborators. In one embodiment, a message is sent by a collaborator and is located in the account of a user.

For example, referring back to FIG. 2, Mary sent the first message and a related message was sent by John. Syd then responded to John's e-mail. These e-mails may all be contained within Susie's account 100. Therefore, Susie is the user and Mary, John and Syd are the collaborators. A user is the owner of the account that contains related attachments. A collaborator is a person who sent or received the related attachments to or from the user's account. To determine if the messages are related, the examination may include, but is not limited to, the message recipient(s), the message sender, the subject line, the size of the message, or other identifying information.

As depicted in FIG. 3, if the messages are compared 320, then the system must determine if the user should be notified 325. The user will be notified if the messages are related. If the messages are not related the system may be completed 330. However, even if the messages are not related, the user may be notified since the attachments are related as they exceeded both the similarity threshold value and the attachment threshold value.

After comparing the messages, the system may notify the user of the related attachments 335. Additionally, if the messages were not compared 315, the user may be notified of the related attachments 335. In another embodiment, notification may be sent to a collaborator.

In one embodiment, the notification may inform a user that the attachments are related. The notification may also inform the user of the status of the messages if the messages were compared. The notification may be transmitted via an e-mail or other form of electronic communication. The notification may be in the form of computer animation which may include, but is not limited to, the use of a wizard. The computer notification may be launched from the user's account and may automate the porting process. In one embodiment, the notification may ask the user how to proceed. Alternatively, the notification may suggest that the user port the attachments to a document management system. In a different embodiment, the notification may state that the attachments are automatically being ported to a document management system.

In another embodiment, a server-based system may determine which collaborator is the primary user to be notified and may ask how to proceed in the porting selection. The user selection may be determined by default or custom settings. The user selection also may be determined by selecting the initiator of the group of related messages or attachments. The initiator may be determined by the message order in a thread, or by dates that attachments were sent.

One or more of the attachments may be ported (i.e., moved or copied) to a document management system 340. A single attachment, both attachments in a pair, or all related attachments may be ported to a document management system. A document management system may be, but is not limited to, a collection of data or information, a collection corresponding to content, or a collection corresponding to knowledge. A document management system may track and organize documents in a repository.

The attachments may be ported to a temporary storage facility or the attachments may be sent directly into a document management system. The attachments may be sent automatically to a document management system or the attachments may be sent to a location based on the notification response. If the attachments are automatically sent to the document management system, the attachments may be placed in a specific location which may be determined by user's default e-mail server-side settings, a default location, or another accessible location. In one embodiment, if the attachments are moved to a location that is not based on the user's input, the system may provide the user with an address or document identifier to inform the user of the location of the attachments. The system may also allow the user to move the attachments to another location. Additionally, the system may notify the collaborators, whose contact information is known, of the location of the attachments in the document management system.

In one embodiment, only the attachment is ported to the document management system. In another embodiment, the attachment and the message are ported to the document management system. In another embodiment, the user may have the option to port the message, along with the attachment, into the document management system.

Once the attachments are placed in a location in the document management system, the attachments may be organized 345. The attachments may be given a for of identification so that they can be readily accessible to a user. In one embodiment, the attachments may contain a document identifier which may be, but not limited to, a document number or internet address. In another embodiment, all related attachments may be given the same document identifier. In one embodiment, the user may provide information to the document management system about the attachments. For example, the attachment may be classified, categorized and/or subcategorized, the user's name may be used and/or various other pieces of information may be included in the document identifier.

In one embodiment, the attachments may contain a version identifier. A version identifier may be, but is not limited to, a numeric value, a symbol, or an alphanumeric value. In another embodiment, the version identifier may be a number where older attachments have lower version numbers and newer attachments have higher version numbers. The order of the version identifier may be determined by, but not limited to, message thread order, message date sent, message date received, attachment name variants, attachment date, or other sequencing mechanisms. In another embodiment, the user may manually order or reorder the version identifier on an attachment.

After the attachment is ported and the attachment is placed in the document management system, the user may be notified 350. The user notification may include, but is not limited to, a wizard, e-mail, or other electronic form of communication. The notification may be sent to a user and/or one or more collaborators whose contact information is known. Additionally, the system may send a message to the user and/or the collaborators suggesting that the document management system be used for further collaboration. The system may also be configured such that the document management system can notify the user and/or the collaborators when the attachments are modified.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
    examining a first attachment in a first message of a user;
    examining a second attachment in a second message of the user, wherein the first attachment is different from the second attachment;
    comparing the first attachment to the second attachment to determine if the attachments are related by determining a similarity score for the first and second attachments; and
    if the comparing determines that the attachments are related based upon a comparison of the similarity score and a similarity threshold, notifying the user that a collaboration may be occurring.

2. The method of claim 1, further comprising porting at least one of the attachments to a document management system.

3. The method of claim 2, wherein the porting comprises automatically porting.

4. The method of claim 2, wherein the notifying comprises notifying the user that at least one of the attachments was ported to the document management system.

5. The method of claim 4, further comprising:
    notifying one or more collaborators when at least one of the attachments was ported to the document management system.

6. The method of claim 1, further comprising:
comparing the first message to the second message to determine if the first message is related to the second message; and
wherein the notifying is performed only if the first message and the second message are determined to be related.

7. The method of claim 6, wherein comparing the first message to the second message comprises comparing at least one of the following data points: information in a reference header, title, sender names and receiver names.

8. The method of claim 6, wherein comparing the first message to the second message includes determining if the messages are located in a discussion thread.

9. The method of claim 1, wherein comparing the attachments comprises comparing at least one of: file name, application, title, size and key word.

10. The method of claim 1, further comprising:
if the comparing determines that the attachments are related, managing the attachments in a document management system.

11. The method of claim 10, wherein managing the attachments in the document management system comprises:
creating a document identifier; and
creating a version identifier.

12. The method of claim 11, wherein the notifying comprises notifying the user that the attachments were ported to the document management system.

13. The method of claim 1, wherein the first message has been received into the user's account.

14. The method of claim 1, wherein the first message has not yet been received into the user's account.

15. The method of claim 1, wherein the first message has been sent from the user's account.

16. The method of claim 1, wherein the first message and the second message are compared before entering the user's account.

17. A method comprising:
monitoring a plurality of electronic messages;
identifying a first electronic message from the plurality of electronic messages wherein the first electronic message contains a first attachment;
identifying a second electronic message from the plurality of electronic messages wherein the second electronic message contains a second attachment and wherein the first attachment is different from the second attachment;
comparing the first attachment with the second attachment to create a pair;
determining a similarity score for the pair;
determining if the similarity score for the pair exceeds a similarity threshold value; and
if the similarity threshold value is exceeded for a predetermined number of pairs, notifying a user that collaboration may be occurring.

18. A method comprising:
monitoring a plurality of electronic messages;
identifying two or more electronic messages from the plurality of messages wherein each identified message contains an attachment such that each message contains a different attachment;
comparing the attachments of the identified messages to determine a similarity score;
determining if the similarity score exceeds a similarity threshold value; and
notifying a user that collaboration may be occurring if the similarity score exceeds the similarity threshold value.

19. The method of claim 18, wherein the notifying step occurs only if the number of attachments having a similarity score that exceeds the similarity threshold value is more than an attachment threshold value.

20. The method of claim 19, further comprising porting at least one of the attachments having a similarity score that exceeds the similarity threshold value.

* * * * *